United States Patent
Rejman

(10) Patent No.: US 7,648,402 B2
(45) Date of Patent: *Jan. 19, 2010

(54) MECHANICAL CODING BETWEEN A BATTERY PACK AND AN ELECTRICAL TOOL

(75) Inventor: Marcin Rejman, Waiblingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/428,890

(22) Filed: Apr. 23, 2009

(65) Prior Publication Data

US 2009/0202896 A1 Aug. 13, 2009

Related U.S. Application Data

(62) Division of application No. 11/718,866, filed on May 8, 2007, now Pat. No. 7,588,471.

(51) Int. Cl.
*H01R 13/64* (2006.01)
(52) U.S. Cl. .................................................. 439/680
(58) Field of Classification Search ............... 439/680, 439/500, 248, 295
See application file for complete search history.

(56) References Cited

U.S. PATENT DOCUMENTS

| 6,551,123 B1* | 4/2003 | Schaeffeler et al. ......... 439/374 |
| 6,675,912 B2* | 1/2004 | Carrier ....................... 173/217 |
| 6,790,053 B2* | 9/2004 | Lin et al. ...................... 439/79 |
| 6,790,067 B2* | 9/2004 | Douty et al. ................ 439/284 |

FOREIGN PATENT DOCUMENTS

DE 44 02 355 8/1995

* cited by examiner

*Primary Examiner*—Nei Abrams
*Assistant Examiner*—Phuong Nguyen
(74) *Attorney, Agent, or Firm*—Michael J. Striker

(57) ABSTRACT

A plug-in battery pack for an electrical tool includes a mechanical coding of a coding system for cooperation with a mechanical counterpart coding of the coding system associated with the electrical tool, in which the coding extends in the insertion direction of the battery pack. The coding has at least one recess that cooperates on opposite sides with at least one projection that is situated on the tool and constitutes the counterpart coding. The coding rib extends out from the wall of the recess.

5 Claims, 3 Drawing Sheets

MECHANICAL CODING BETWEEN A BATTERY PACK AND AN ELECTRICAL TOOL

CROSS REFERENCE TO RELATED APPLICATIONS

The invention described and claimed hereinbelow is also described in PCT/EP2006/050008, filed on Jan. 3, 2006 and DE 10 2005 008 036.7, filed on Feb. 22, 2005. This German Patent Application, whose subject matter is incorporated here by reference, provides the basis for a claim of priority of invention under 35 U.S.C. 119 (a)-(d).

The present application is a divisional application of U.S. application Ser. No. 11/718,866 filed May 8, 2007, now U.S. Pat. No. 7,588,471.

BACKGROUND OF THE INVENTION

The invention relates to a plug-in battery pack for an electrical tool, having a mechanical coding of a coding system for cooperation with a mechanical counterpart coding of the coding system associated with the electrical tool, in which the coding extends in the insertion direction of the battery pack.

In order to assure the attachment of the correct battery pack to the electrical tool, it is known to use mechanical coding systems that only permit the battery pack to be inserted and electrically connected if the battery pack has a coding that corresponds to the counterpart coding of the electrical tool. The prior coding designs, however, have the disadvantage that with the exertion of sufficiently intense insertion forces, in particular improperly high insertion forces, the mechanical coding elements can be destroyed or "forced" due to lateral deflection so that it is also possible for incorrect battery packs to be inserted into the receiving shaft of the electrical tool. In the context of this application, the term "battery pack" is understood to be a rechargeable battery pack composed of a plurality of cells that supplies the energy for the operation of the electrical tool and is accommodated in replaceable fashion in a chamber or the like of the electrical tool. The battery pack is attached to the electrical tool by being plugged in or inserted. If the energy of the battery pack runs out, then the battery pack can be removed and placed in a charging station. If there are a number of battery packs available, it is then possible to remove the discharged battery pack from the electrical tool and replace it with a charged one. When switching battery packs or when reattaching the recharged battery pack, preventing an incorrect battery pack from then being attached to the electrical tool—which could occur particularly when using a number of different battery packs for different electrical devices—requires a secure and essentially non-manipulable coding system. Such a coding system should also prevent the use of incorrect battery packs that should not be attached to the electrical tool.

SUMMARY OF THE INVENTION

The present invention offers the advantage that improper manipulations, i.e. the attachment of incorrect battery packs to the electrical tool, are prevented by virtue of the fact that the coding has at least one recess that cooperates on opposite sides with at least one projection on the tool that constitutes the counterpart coding. Accordingly, the counterpart coding that is associated with the electrical tool is comprised of at least one projection, the battery pack has at least one corresponding recess, and opposite sides of the recess cooperate with the projection when the battery pack is being inserted into the electrical tool. If an incorrect battery pack is used in which the coding and the counterpart coding do not precisely correspond to each other in the correct way, then because of the non-matching dimensions, the projection rests against the outer edge or outer edges of the recess. If an improperly high level of force is then nevertheless exerted in an attempt to push the battery pack in, then the projection is deflected slightly in the lateral direction, for example, because a wall surface of the recess acts on it laterally with the result that the end surface of the projection comes to rest against the corresponding opposite outer edge of the recess and further insertion is blocked. The "forcing" explained above in connection with the prior art is therefore not possible. Only an extremely violent insertion could possibly nevertheless force the battery pack into the electrical tool, but this would be accompanied by a mechanical destruction of large regions so that the entire arrangement would become unusable, for example due to breakage of contacts or cracking of housing zones or the like. The user tends to refrain from such an improper action, thus assuring that only correct battery packs will be attached to the electrical tool.

According to a modification of the invention, the recess has at least two wall surface regions situated opposite each other in accordance with the thickness of the projection. When the battery pack is being attached to the electrical tool, the projection travels between these two wall surface regions, i.e. the two wall surface regions, embrace the projection and guide it as it passes between them. It is therefore clear that a lateral bending of the projection would cause a stoppage that prevents the insertion movement of the battery pack and even powerful forces would not be able to overcome this stoppage.

It is advantageous if the recess is a circumferentially closed recess. This is understood to mean a recess whose recess edge describes an intrinsically closed, loop-shaped line. Alternatively, it is also possible for the recess to be a recess that is open at the edge, i.e. it is accessible—from the side—through at least one opening; in other words, its edge is not an intrinsically closed, loop-shaped line, but instead forms an open U-shape, for example.

It is also advantageous if the recess has a single-cornered, multi-cornered, arc-shaped, and/or circular outline structure. The projection is correspondingly provided with the same outline structure, thus permitting a definite association between the projection and the recess. This prevents incorrect rotational positioning of the battery pack and the electrical tool.

The recess is preferably embodied in the form of a cylindrical recess, i.e. its wall surfaces extend parallel to one another. They do not taper down toward the bottom of the recess, but instead extend parallel to the insertion direction. The term "cylindrical" is correspondingly understood to mean that an imaginary line extending from the recess edge to the recess bottom is shifted parallel to itself along an arbitrary closed or non-closed curve that defines the cylinder contour so that the recess does not have any surfaces, wall sections, or the like that extend obliquely in relation to the insertion direction.

According to a modification of the invention, the recess is situated in the vicinity of electrical contacts of the battery pack. It is therefore advantageous if the blocking action of non-matching coding elements is exerted in the vicinity of the electrical contacts and therefore reliably prevents a contacting of the battery pack with the corresponding connections of the electrical tool.

In particular, the recess can be situated between at least two electrical contacts of the battery pack. This likewise achieves the above-mentioned advantages.

According to a modification of the invention, the recess is situated on a contact dome of the battery pack. This contact dome supports the coding on the one hand and on the other hand, also supports the electrical contact elements for producing an electrical connection between the battery pack and the electrical tool through the insertion of the battery pack into the electrical tool.

Preferably, the recess and/or the contact dome is/are situated eccentrically in relation to the center of the base surface of the battery pack, thus preventing incorrect rotational positioning and thus permitting the battery pack to be attached to the electrical tool in only a single position.

In order to create a multitude of permutations, i.e. in order to permit certain battery packs to be plugged into an electrical tool but to prevent other battery packs, possibly equipped with the same electrical parameters, from being connected to a particular electrical tool, at least one coding rib extends out from the wall of the recess. In addition to the coding unit already comprised by the projection and the recess, the coding rib provides an additional, improved coding measure. This is particularly the case if the coding rib extends out from the wall of the recess at a certain positions out of a plurality of different positions in order to produce various permutations. Accordingly, there are battery packs with coding ribs that differ from other battery packs with coding ribs in that the coding ribs of the various battery pack embodiments are situated in different positions inside the recess, extending out from the wall of the recess so that this provides a differentiation between permutations. These different permutations are naturally implemented only when the projection has a corresponding shape—in particular an outline structure—that takes into account the coding rib or coding ribs.

According to a modification of the invention, at least one pair of coding ribs extends out from the wall of the recess, whose coding ribs are situated opposite from each other so that they overlap at least partially. Correspondingly, a pair of coding ribs is composed of two coding ribs that are situated opposite from and spaced apart from each other so that the projection can slide between their end surfaces as the battery pack is inserted into the electrical tool. In this case, it is not necessary for the two coding ribs—viewed transversely to the insertion direction—to be aligned with each other, i.e. for them to have the same width as each other and be situated in an aligned position one behind the other (aligned end surfaces), instead, it is also possible to use coding ribs that do not have the same width and comprise a pair of coding ribs and/or are situated offset from each other. But the offset is not so great as to leave a lateral open space between them; instead, the end surfaces overlap each other at least partially.

According to a modification of the invention, the recess, which is open at the edge, is adjoined by at least one outside wall surface situated opposite from a region of the projection. Correspondingly, at least one region situated outside the open-at-the-edge recess is also used for the coding system in that the projection extends not only inside the open-at-the-edge recess, but also reaches into the lateral opening of the recess and extends so that it faces an outer wall surface situated there, which adjoins the recess. This increases the variety of permutations and also increases the security of the permutations system because of the larger-area embodiment of the elements.

Finally, the invention relates to a coding system for an electrical tool provided with a plug-in battery pack, in particular according to one or more of the preceding embodiments and modifications; the battery pack has a mechanical coding, the electrical tool has a mechanical counterpart coding, and the coding and counterpart coding extend in the insertion direction; the coding is embodied as at least one recess, the counterpart coding is embodied as at least one projection, and the coding and counterpart coding are matched to each other in a form-fitting fashion and engage in each other when the battery pack is in the inserted position. In this case in particular, the projection cooperates with opposing sides of the recess.

BRIEF DESCRIPTION OF THE DRAWINGS

Several exemplary embodiments of the invention are depicted in the drawings.

DETAILED DESCRIPTION OF THE PREFERRED EMBODIMENTS

Figure 1:
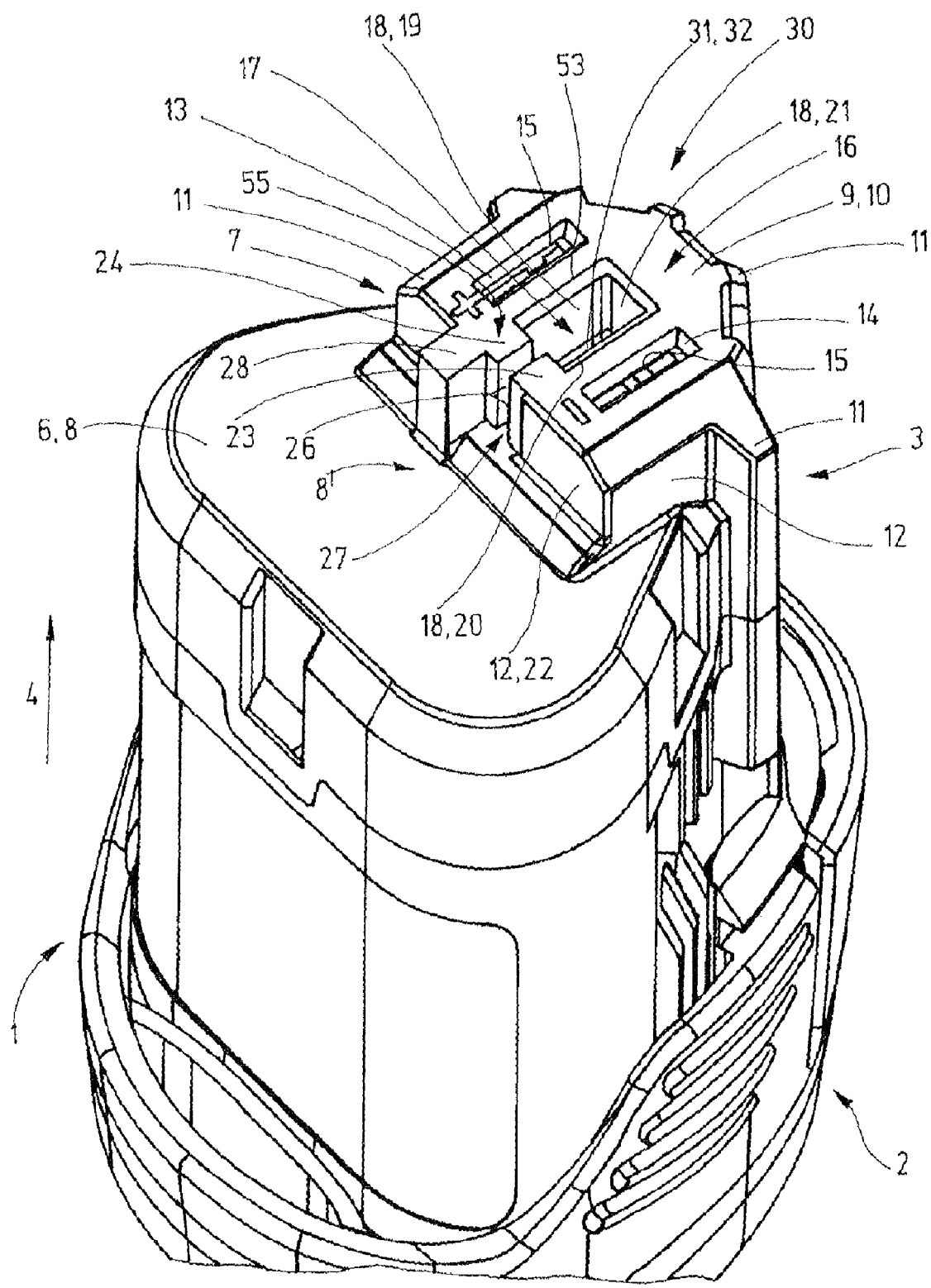
FIG. 1 is a perspective view of a coding of a plug-in battery pack for an electrical tool.

FIG. 1 shows a section of a plug-in battery pack 1 for an electrical tool that is not shown. The battery pack 1 has a grip 2 that a user can hold in order, for example, to withdraw it from a charging unit and to insert its insertion region 3 into an electrical tool in the insertion direction 4. The insertion region 3 has an end surface 6 that constitutes a bottom surface 8 and extends perpendicular to the insertion direction 4. The end surface 6 is provided with a contact dome 7. This contact dome 7 is situated eccentrically in relation to the bottom surface center 8' of the battery pack 1. The contact dome 7 extends essentially in the insertion direction 4. The contact dome 7 has a top 9, which has an end surface 10 that extends parallel to the end surface 6, i.e. perpendicular to the insertion direction 4, and has oblique surfaces 11. The contact dome 7 has side surfaces 12 that extend perpendicular to the end surface 6 and the end surface 10. The end surface 10 of the contact dome 7 is provided with two contact openings 13 and 14 that contain electrical contacts 15. The contact dome 7 also has a mechanical coding 16, which cooperates with a counterpart coding of the electrical tool, not shown in FIG. 1, to form a coding system 30. The counterpart coding will be discussed in the description of FIG. 2. The mechanical coding 16 of the battery pack 1 has a recess 17. The recess 17 has a rectangular bottom surface 31 that constitutes a recess bottom 32 of the recess 17. The recess 17 has a wall 18 that is composed of wall surface regions 19, 20, and 21. The wall 18 extends parallel to the insertion direction 4. The wall surface regions 19 and 20 are situated opposite from and parallel to each other. The wall surface region 21 respectively extends at right angles to the wall surface regions 19 and 20. The side of the recess 17 opposite from the wall surface region 21 is open at the edge, i.e. the recess 17 opens out onto an outer wall surface 22 that constitutes one of the side surfaces 12 of the contact dome 7. It is also clear from FIG. 1 that the two opposing wall surface regions 19 and 20 have coding ribs 23 and 24 extending from them, which are situated opposite each other in an aligned fashion, with end surfaces 26 spaced apart from each other. This means that an intermediate space 27 is formed between the end surfaces 26. The coding ribs 23 and 24 provide an improved coding measure of the recess 17. The recess 17 is situated at least partially between the contacts 15. The outer wall surface 22 has a rib 28 extending from it, which is likewise part of the coding system 30, i.e. is part of the coding 16. Alternatively, it is also possible for such a rib 28 not to be provided (not shown).

Figure 2:
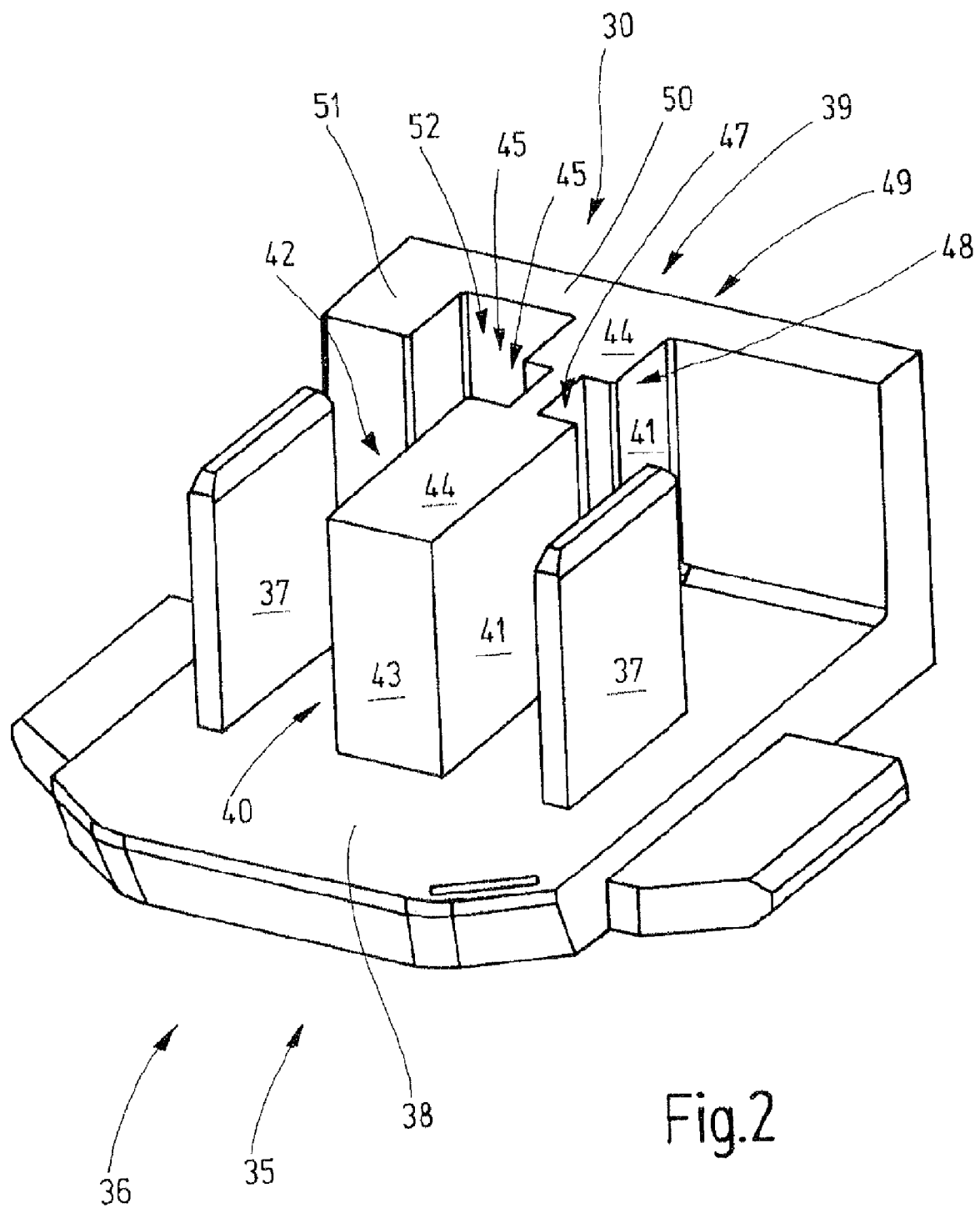
FIG. 2 shows a section of the electrical tool that has a counterpart coding that fits the coding shown in FIG. 1.

FIG. 2 shows a section 35 of an electrical tool 36, which is otherwise not shown, into which the battery pack 1 can be inserted. The insertion shaft that accommodates the battery pack 1 is not shown in FIG. 2. The section 35 of the electrical tool 36 has two contact tabs 37 that cooperate with the contacts 15 when the battery pack 1 is in the inserted position. Through this connection, the battery pack 1 supplies the electrical energy to the electrical tool 36. The two contact tabs 37 extend out from a base plane 38 of the electrical tool 36 on which a counterpart coding 39 of the coding system 30 is also situated. Upon insertion of the battery pack 1, the counterpart coding 39 cooperates with the coding 16 so that the battery pack can only be inserted if the coding 16 and the counterpart coding 39 coincide.

The counterpart coding 39 has a projection 40 that has two wall surfaces 41 situated opposite each other and 42 as well as an end surface 43 and a top surface 44. The projection 40 also has a waist 45 that is formed by two indentations 46 and 47 in the wall surfaces 41 and 42. The distance between the two wall surfaces 41 and 42 corresponds to the distance between the wall surface regions 19 and 20 of the recess 17, with a very small amount of play taken into account. In addition, the dimensions of the indentations 46 and 47 correspond to the contours of the two coding ribs 23 and 24, also with a small amount of play taken into account. This also affects the arrangement in such a way that when the coding 16 and counterpart coding 39 are put together, the region 48 of the projection 40 on the other side of the waist 45 comes to rest next to the rib 28 of the coding 16. The projection 40 is adjoined by an L-shaped wall region 49 that has a leg 50 and a transverse leg 51. Between the transverse leg 51, the leg 50, and the region 48 of the projection 40, an indentation 52 is formed, whose dimensions correspond to the dimensions of the rib 28 of the coding 16, taking into account a certain amount of play.

It is clear from the foregoing that as the battery pack 1 is being attached to the electrical tool 36, the following coding function comes into play: the projection 40 travels in a form-fitting fashion into the recess 17, in the process of which the two coding ribs 23 and 24 enter the indentations 46 and 47 while the rib 28 enters the indentation 52. As has already been mentioned above, the coding function does not require the provision of a rib 28. Correspondingly, it is also possible to eliminate the L-shaped wall region 49 in the counterpart coding 39.

If a battery pack 1 is used, whose coding 16 does not match the shape of the counterpart coding 39 of the electrical tool 36, e.g. because the distance between the two wall surface regions 19 and 20 is smaller than the distance between the wall surfaces 41 and 42 of the projection 40, then the "forcing" known from the prior art is not possible, i.e. the projection 40 and recess 17 cannot be pushed together even with the use of a very powerful force because a lateral deflection of the projection 40 is not possible since the top surface 44 of the projection 40 would come to rest on the recess edge region 53 of the coding 16 and therefore would block a further insertion.

In order to increase the variety of permutations of the coding 16 and counterpart coding 39, according to exemplary embodiments that are not shown, the two coding ribs 23 and 24 that a coding rib pair 55 extend out from the wall 18 of the recess 17 at correspondingly different positions. By contrast with the position shown in FIG. 1, the coding ribs 23 and 24 can, for example, be situated closer to the wall surface region 21 of the recess 17. In order to construct a permutation system, it is possible to provide a pattern of corresponding spacings for the various positions of the coding rib pair 55. By contrast with the embodiment shown in FIG. 1, it is thus also possible for the two coding ribs 23 and 24 to not be aligned with each other, but instead to be situated slightly offset from each other so that their two end surfaces 26 are situated only partially opposite each other. Alternatively or in addition, it is also possible to provide additional coding ribs or additional coding rib pairs. The structure of the projection is then embodied in a corresponding fashion.

Figure 3:
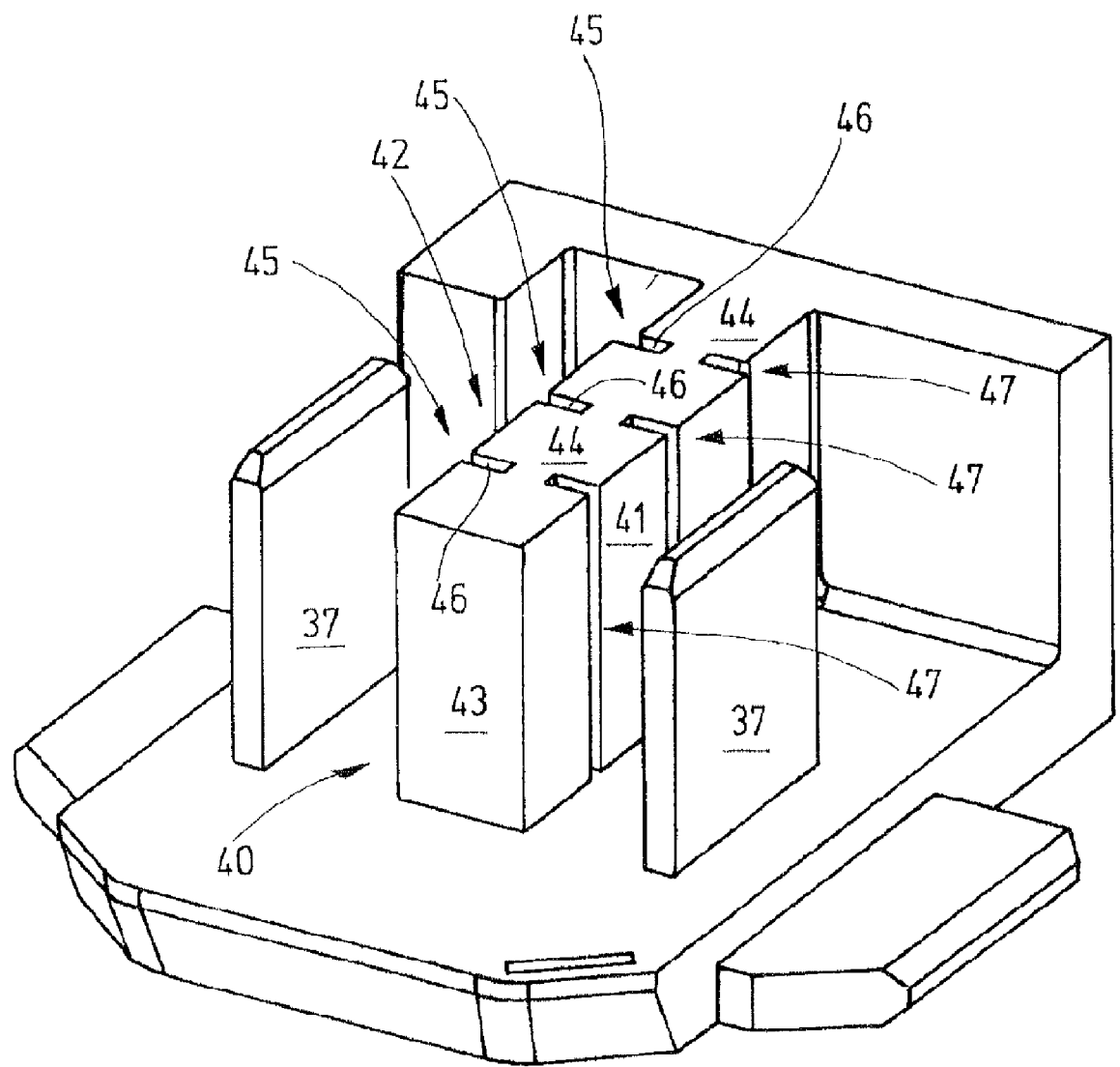
FIG. 3 shows a different counterpart coding of an electrical tool.

FIG. 3 shows an exemplary embodiment in which the projection 40 has for example three waists 45, i.e. since the counterpart coding 39 is thus provided with three indentations 46 and three indentations 47, the coding 16, not shown, which is embodied in a form-fitting fashion in relation to this, will therefore have three coding rib pairs 55. It is clear from all of the above that the coding system 30 thus produced permits the implementation of a very large number of permutations.

What is claimed is:

1. A plug-in battery pack for an electrical tool, having a mechanical coding of a coding system for a cooperation with a mechanical counterpart coding of the coding system associated with the electrical tool, in which the coding extends in the insertion direction of the battery pack,
    wherein the coding (16) has at least one recess (17) that cooperates on opposite sides with at least one projection (40) that is situated on the tool and constitutes the counterpart coding (39), and wherein at least one coding rib (23, 24) extends out from the wall (18) of the recess (17).

2. A plug-in battery pack as defined in claim 1, wherein the at least one recess (17) is adjoined by at least one outer wall surface (22) and a coding rib (28) extends from said outer wall surface (22).

3. A plug-in battery pack for an electrical tool, having a mechanical coding of a coding system for a cooperation with a mechanical counterpart coding of the coding system associated with the electrical tool, in which the coding extends in the insertion direction of the battery pack,
    wherein the coding (16) has at least one recess (17) that cooperates on opposite sides with at least one projection (40) that is situated on the tool and constitutes the counterpart coding (39), wherein the recess (17) is provided on an end surface of a contact dome (7) of the battery pack (1), wherein said end surface extends perpendicular to the insertion direction.

4. A plug-in battery pack as defined in claim 3, wherein the at least one recess (17) is adjoined by at least one outer wall surface (22) and a coding rib (28) extends from said outer wall surface (22).

5. A coding system for an electrical tool provided with a plug-in battery pack, in which the battery pack has a mechanical coding, the electrical tool has a mechanical counterpart coding, and the coding and counterpart coding extend in an insertion direction of the battery pack,
    wherein the coding (16) is embodied as at least one recess (17), the counterpart coding (39) is embodied as at least one projection (40), and the coding (16) and counterpart coding (39) are matched to each other in a form-fitting fashion and engage in each other when the battery pack (1) is in the inserted position.

* * * * *